July 30, 1963  P. URBAN ETAL  3,099,536
PROCESS FOR THE RECOVERY OF CRYSTALLINE SULFUR
Filed July 5, 1960
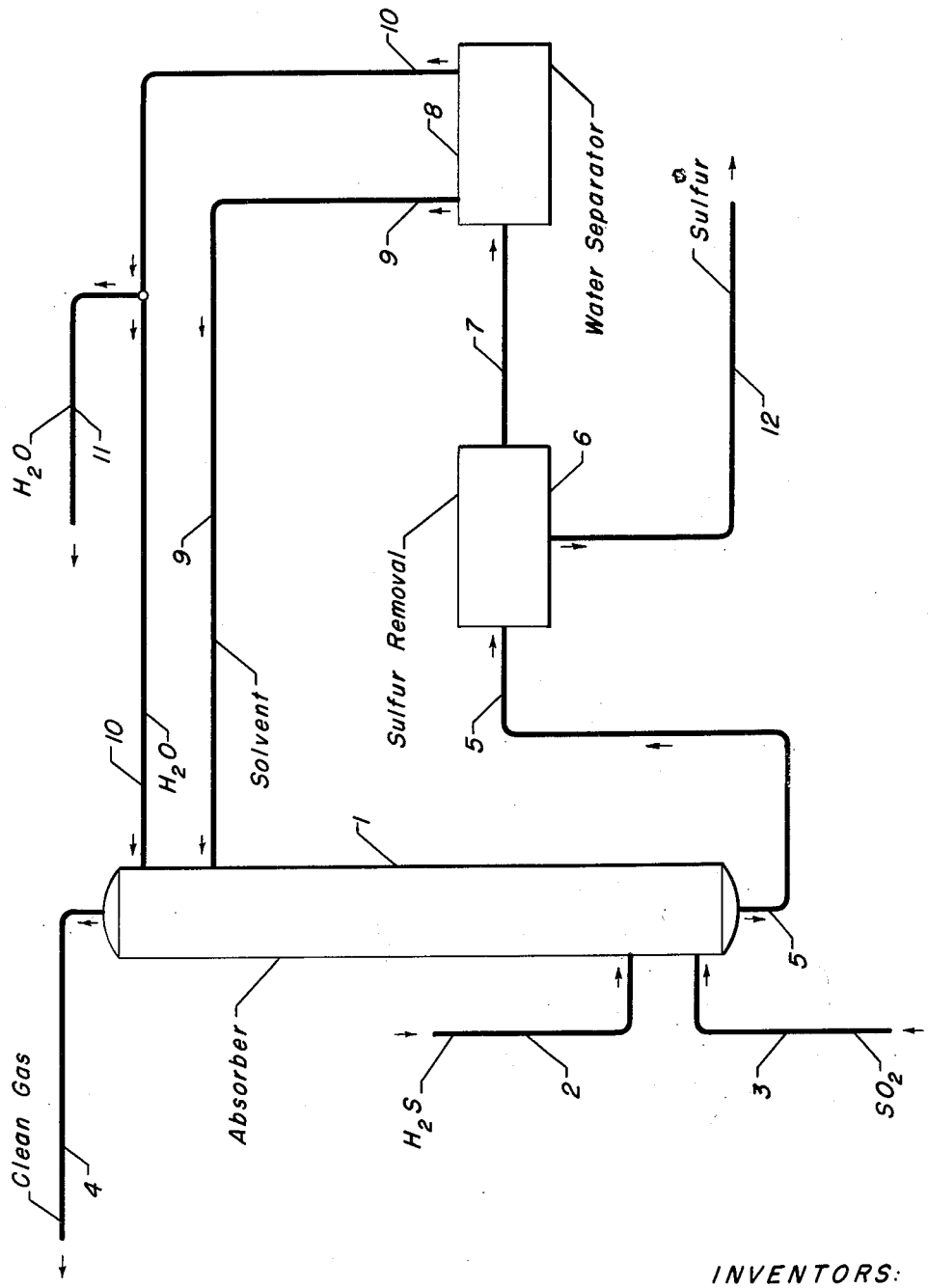
INVENTORS:
Peter Urban
Lester G. Massey
BY: Chester J. Giuliani
Raymond H. Nelson
ATTORNEYS

United States Patent Office 3,099,536
Patented July 30, 1963

3,099,536
PROCESS FOR THE RECOVERY OF
CRYSTALLINE SULFUR
Peter Urban, Northbrook, and Lester G. Massey, Arlington Heights, Ill., assignors to Universal Oil Products Company, Des Plaines, Ill., a corporation of Delaware
Filed July 5, 1960, Ser. No. 40,841
6 Claims. (Cl. 23—226)

This application is a continuation-in-part of our copending application Serial No. 554,591, filed December 21, 1955, now abandoned.

This invention relates to a process for the production of sulfur and particularly to a process for producing sulfur from hydrogen sulfide. In addition, the invention also relates to a process for purifying a gas stream by removing hydrogen sulfide from said stream.

In many industrial processes, large amounts of sulfur are wasted by being vented to the atmosphere as hydrogen sulfide. Typical of these are processes for preparing various petroleum products, coking of coal, steel manufacture and others. In many cases, the sulfur is a contaminant in the ultimate desired product and is converted to hydrogen sulfide during processing and disposed of in that form. Besides being wasteful, venting hydrogen sulfide to the atmosphere creates a nuisance which must be abated in many communities to conform with local regulations.

Several solutions to this problem have been put into effect and these mostly have been used to abate the nuisance rather than to conserve sulfur. The processes are usually difficult to effect and rather costly and usually consist of converting the hydrogen sulfide to sulfur or sulfuric acid or some other salable form. One such solution has been to separate the hydrogen sulfide from the main stream by such means as an absorber employing an alkaline liquid such as an amine or metal hydroxide solutions in countercurrent contact with the hydrogen sulfide containing gas. The absorbing liquid is then stripped of $H_2S$ and $H_2S$ is partially burned to form $SO_2$ and water and the remaining $H_2S$ is reacted with the $SO_2$ to produce sulfur and water. The reaction is effected at high temperatures employing a heterogeneous catalyst such as bauxite and preferably at high pressure. This method has many unsatisfactory features including the expense and difficulty of concentrating $H_2S$ by means of an alkaline solution with subsequent stripping, the use of heterogeneous catalysts which are not too well suited to chemical processes resulting in solid products, the difficulty of using corrosive materials such as water-$SO_2$ mixtures at high temperature and, in fact, the difficult of employing high temperatures. It is an object of this invention to provide a novel process for recovering substantially pure sulfur from a gas stream containing $H_2S$ or mercaptans. Because of the great abundance of $H_2S$ containing gas streams, this invention will be described primarily in relation to this particular compound. The process of this invention overcomes the difficulties hereinbefore enumerated by providing a simple, liquid phase, low temperature, non-catalytic process which results in large conversions of hydrogen sulfide to substantially pure sulfur.

One embodiment of this invention resides in a process for the production of sulfur which comprises absorbing sulfur dioxide and hydrogen sulfide in a solvent comprising an alcohol, and having from about 0.5% to about 40% by volume of water dissolved therein, reacting the sulfur dioxide and hydrogen sulfide in contact with said solvent, thereby forming sulfur, and separating the sulfur from said solvent.

A specific embodiment of the invention is found in a process for the production of sulfur which comprises absorbing sulfur dioxide and hydrogen sulfide in a solvent comprising methanol, and having from about 0.5% to about 40% by volume of water dissolved therein, reacting the sulfur dioxide and hydrogen sulfide in contact with said methanol, thereby forming sulfur and separating the sulfur from said solvent.

Other objects and embodiments referring to alternative alcohols will be found in the following further detailed description of the invention.

Briefly, the process of this invention provides for effecting the reaction between sulfur dioxide and hydrogen sulfide to form sulfur and water while these two reactants are absorbed in a common liquid medium. By providing for such solution or absorption, the molecules are apparently brought into close proximity with others so that reactions can occur more readily between them. In the process of this invention, the reaction occurs without a catalyst substantially to completion even at ambient temperatures in contrast to the process employing a vapor phase which requires high temperatures and a catalyst and which results in low conversions compared with the present process.

The solvent employed in this invention must have certain characteristics. Since a certain amount of water is required for the reaction to proceed rapidly, as will be hereinafter demonstrated, water must necessarily be soluble in the solvent to some significant extent. Another characteristic is that the solvent must be capable of absorbing or dissolving both hydrogen sulfide and sulfur dioxide. Another requirement of the solvent, although one that is easily met, is that it must not dissolve large quantities of sulfur inasmuch as a solvent having this characteristic would introduce another step in the process, namely recovering dissolved sulfur from the solvent.

Two distinct types of solvent may be used. The first is a solvent miscible in all proportions with water and when such a solvent is used, means must be provided to remove excess water from the solvent so that too much dilution does not occur. The other type of solvent is one which dissolves only limited quantities of water. A solvent with limited miscibility with water, to be used in this invention, must be capable of dissolving the necessary quantities of water to be hereinafter described and preferably is saturated within the desired water concentration range. When such a solvent is used, the excess water which results from the reaction may be removed simply by drawing off the aqueous phase.

It has now been discovered that not all organic solvents are suitable for the production of sulfur, certain oxygenated organic compounds such as the glycols although effective in some respects in forming sulfur possess the disadvantage of having the sulfur thus formed in a flocculent or tacky state which is difficult to recover by the commercial methods of separation. The sulfur formed by the use of glycols as the solvent in this process is difficult to separate by filtration. For example, solutions of sulfur suspended in diethylene glycol or triethylene glycol when subjected to filtration resulted in either the solutions passing through a filter without leaving any sulfur, or after a period of time, said suspensions would clog the filter completely before any substantial amount of solution had passed through. However, in contra-distinction to this, we have now discovered that when certain organic compounds such as alcohols are utilized as the organic solvent in the process of this invention, the sulfur which is produced is crystalline in form as contrasted to the amorphous form of sulfur produced when glycols are used as solvents. The sulfur crystals formed wehn using an alcohol as the organic solvent are large and readily filterable, whereas the sulfur crystals, when using glycols as the organic solvent, form into some type of gelatinous, compressible mass. However, this mass is tacky in contrast to the hard crystals hereinbefore set forth and thus cannot be readily filtered.

The particular organic compound utilizable in this process consists of aliphatic alcohols such as metanol, ethanol, propanol, isopropanol, n-butanol, t-butanol, n-pentanol, n-hexanol, heptanols, octanols, nonanols, decanols, etc.; aromatic alcohols such as benzyl alcohol, o-tolyl carbonyl, m-tolyl carbonyl, etc. It is to be understood that the aforementioned alcohols are only representatives of the class of compounds which may be used as solvents and that the present invention is not necessarily limited thereto.

The process of this invention may be best described with reference to the accompanying drawing which is intended to be illustrative of the invention rather than limiting on its broad scope.

In the drawing, $H_2S$ or $H_2S$-containing gas from any source such as those hereinbefore described is introduced through line 2 into the lower portion of absorber 1. This gas may be, for example, the normally gaseous material in the effluent from a petroleum desulfurization or reforming process, in which case it is desirable to recirculate the hydrogen in the gas, but to remove the hydrogen sulfide from it since hydrogen sulfide has an adverse effect upon the catalysts employed in such process. In absorber 1, the rising hydrogen sulfide is mixed with $SO_2$ which is introduced into the lower portion of absorber 1 through line 3 and the mixture is contacted with a descending water-containing alcohol stream. Absorber 1 will contain internal means for effecting intimate contact between a rising gas stream and a descending liquid stream such as, but not limited to, perforated plates, bubble cap plates, turbo-grid trays, packing, screens or any other conventional device for causing such contact. The alcohol in this embodiment is introduced into the upper portion of absorber 1 through line 9 and is obtained as will be hereinafter discussed.

The water for such an absorber may be introduced commingled with the alcohol stream or preferably in a separate stream disposed above the alcohol stream such as through line 10. The purpose of this is to remove alcohol from the hydrogen sulfide-free gas stream discharging from the top of absorber 1 through line 4. This not only is conservative of alcohol but prevents adverse effects which such solvent might have as an impurity in the gas stream.

As the alcohol and water descend through absorber 1 they absorb hydrogen sulfide and sulfur dioxide. The alcohol and water are maintained at a temperature of from about 0° to about 120° C. or higher and preferably from about 20° to about 100° C. The only temperature limitation on this process is that the temperature must be such as to have a liquid phase solvent at absorber conditions. When maintained at these conditions, the absorbed hydrogen sulfide and sulfur dioxide react to form pure sulfur and water. The resultant stream discharging from the bottom of absorber 1 through line 5, therefore, contains alcohols such as those hereinbefore described, water, sulfur, and sometimes unreacted hydrogen sulfide and sulfur dioxide. It should be mentioned here that the selection of a suitable solvent and optimum operating conditions will cause substantially complete reaction of hydrogen sulfide with sulfur dioxide so that the residual unreacted components in the stream discharging from absorber 1 will be negligible. The material passing through line 5 passes to sulfur removal zone 6 wherein the sulfur is removed from the stream and thereafter passed out to a recovery zone, not shown, through line 12. When the sulfur product is solid it may be removed by filtration, centrifugally, by settling or any other known means of removing solid particles from a liquid. The sulfur may be removed as a liquid when the sulfur removal zone is at a sufficiently high temperature, in which case it may simply be drawn off from theh total liquid as a separate immiscible phase.

The sulfur-free liquid passes through line 7 to water separator 8 wherein the water formed in the reaction of $H_2S$ with $SO_2$ is removed to prevent a build-up of water in the circulating solvent stream. Water separator 8 may consist merely of a settling zone when the solvent employed dissolves only limited quantities of water. When the solvent is miscible with water to too great an extent, then water removal zone 8 must separate water from the solvent by some other means such as fractionation, evaporation, hydration of salts, etc. Water separator 8 may separate water only to the extent that it was added by the reaction in which case water will be withdrawn through lines 10 and 11 and the desired water-solvent mixture will pass to the top of absorber 1 via line 9. Water separator 8 may, however, separate more water from the solvent than what was added by the reaction in which case some water is withdrawn via line 11 but some is added to the upper portion of absorber 1 via line 10 to scrub solvent from the exit gas as hereinbefore described.

As will be hereinafter demonstrated, the solvent of this invention preferably contains from about 10.0% to about 40% by volume of water. It is preferred that the solvent employed have limited water solubility but it must dissolve at least 0.5% and preferably not more than 40% water at the temperature conditions in absorber 2. As hereinbefore stated, an alcohol having these characteristics may conveniently be used since the water of reaction can be separated by settling and an elaborate fractionation zone is not required.

In addition to the continuous process hereinbefore described the process of this invention may also be effected in a batch type operation. When a batch type operation is used the desired alcohol and the water are placed in an appropriate apparatus following which the sulfur dioxide and hydrogen sulfide are then bubbled through the solution. After a predetermined period of time has elapsed the solution containing the crystalline sulfur is then subjected to filtration whereby the sulfur is separated from the alcohol and water.

The following examples are given to illustrate the process of the present invention which, however, are not intended to limit the generally broad scope of the present invention in strict accordance therewith.

*Example I*

In this experiment methyl alcohol (methanol) was utilized as the organic solvent. Anhydrous methanol was divided into three separate portions and water was added to each of the methanol portions to bring the solvent to the desired water content, the resulting solutions containing 10%, 20% and 30% by volume of water, respectively. Following this, each portion of the solvent was divided into two aliquots and sulfur dioxide was added to one aliquot of each water concentration by bubbling the gas therethrough for a period of about 5 minutes. The sulfur dioxide content was then determined by iodine-titration, the aliquot of the 10% by volume of water concentration containing 1.3% by weight of sulfur dioxide, the 20% water portion contained 1.1% and the 30% water portion contained 1.0% by weight of sulfur dioxide. Hydrogen sulfide gas was bubbled into the other aliquot of the preselected solvent containing water for a period of about 10 to about 20 minutes. This longer time for absorption of hydrogen sulfide is due to the fact that the solubility of hydrogen sulfide in the solvents is much less than sulfur dioxide. Following this the concentration of the hydrogen sulfide in the solvent was determined by iodine-thiosulfate titration, the 10% water-methanol portion contained 0.76% by weight of hydrogen sulfide, the 20% water-methanol portion contained 0.69% and the 30% water-methanol portion contained 0.60% by weight of hydrogen sulfide.

The two aliquots of each of the different water concentrations were combined in graduated cylinders and the formation of sulfur therefrom observed. After 10 minutes had passed the sulfur began to settle out from each of the different water concentration solutions and after 25 minutes had passed coagulation of the sulfur had occurred to a considerable extent in the solutions.

At the same time that the above experiments were being performed, a similar experiment utilizing diethylene glycol was also run in a manner similar to that set forth above. Diethylene glycol containing 2–6% water was divided into two portions, one portion having sulfur dioxide gas bubbled therethrough while the other portion had hydrogen sulfide gas bubbled therethrough. One aliquot portion contained 1.4% by weight of hydrogen sulfide while the other portion contained 0.67% by weight of sulfur dioxide. The aliquot portions were combined and mixed. At the end of 25 minutes the solution containing the diethylene glycol had not shown any signs of agglomeration.

*Example II*

In this example anhydrous ethyl alcohol was divided into three portions and water added thereto so that the final solutions contain 10%, 20% and 30% by volume of water, respectively. Each of the three solutions is then divided into two aliquot portions. Sulfur dioxide gas is bubbled through one of the aliquot portions while hydrogen sulfide gas is bubbled through the other. The two portions are combined and mixed thereby causing the formation of sulfur. The sulfur will precipitate in a crystalline form within a relatively short period of time and is easily separable from the solution by conventional means such as filtration.

*Example III*

In this experiment a predetermined amount of n-propyl alcohol is divided into three portions and water is added thereto so that the total content of water is 10%, 20% and 30% by volume, respectively. Each of the resulting solutions is divided into two aliquot portions. The sulfur dioxide gas is bubbled through one portion while hydrogen sulfide gas is bubbled through the other portion. Upon completion of the gas addition the two portions are combined. The sulfur, as in the solutions described in the above examples, precipitates in a crystalline form which is easily separable by filtration.

*Example IV* n-Butyl alcohol (butanol) is divided into three portions and treated with water so that the three portions will contain 10%, 20% and 30% by volume, respectively. Each of the water-butanol solutions is divided into two aliquot portions, one portion having sulfur dioxide gas bubbled therethrough while the other portion has hydrogen sulfide gas bubbled therethrough. After completion of the addition of sulfur dioxide and hydrogen sulfide to the aliquots, said aliquots in each water concentration range are combined. The sulfur thus produced will precipitate in a crystalline state in each of the water concentration solutions within a relatively short period of time and will be easily separable by conventional means such as filtration.

*Example V*

In this experiment anhydrous pentanol (pentyl alcohol) is treated in a manner similar to that set forth in the above examples, that is, three solutions containing 10%, 20% and 30% by volume of water, respectively, are prepared. Each of these water-pentanol solutions are divided into two aliquot portions and are treated with hydrogen sulfide gas and sulfur dioxide gas. After completion of the gas addition the two portions in each water range are comibned and mixed. The sulfur thus produced will precipitate in a crystalline form and will be easily separable by filtration.

We claim as our invention:

1. A process for the production of sulfur in a readily recoverable crystalline state which comprises absorbing sulfur dioxide and hydrogen sulfide in a solvent consisting essentially of methanol having from about 10% to about 40% by volume of water dissolved therein, reacting the sulfur and hydrogen sulfide in contact with said solvent, thereby forming sulfur in a readily recoverable crystalline state and separating the sulfur from said solvent.

2. A process for the production of sulfur in a readily recoverable crystalline state which comprises absorbing sulfur dioxide and hydrogen sulfide in a solvent consisting essentially of ethanol having from about 10% to about 40% by volume of water dissolved therein, reacting the sulfur and hydrogen sulfide in contact with said solvent, thereby forming sulfur in a readily recoverable crystalline state and separating the sulfur from said solvent.

3. A process for the production of sulfur in a readily recorable crystalline state which comprises absorbing sulfur dioxide and hydrogen sulfide in a solvent consisting essentially of propanol having from about 10% to about 40% by volume of water dissolved therein, reacting the sulfur and hydrogen sulfide in contact with said solvent, thereby forming sulfur in a readily recoverable crystalline state and separating the sulfur from said solvent.

4. A process for the production of sulfur in a readily recoverable crystalline state which comprises absorbing sulfur dioxide and hydrogen sulfide in a solvent consisting essentially of butanol having from about 10% to about 40% by volume of water dissolved therein, reacting the sulfur and hydrogen sulfide in contact with said solvent, thereby forming sulfur in a readily recoverable crystalline state and separating the sulfur from said solvent.

5. A process for the production of sulfur in a readily recoverable crystalline state which comprises absorbing sulfur dioxide and hydrogen sulfide in a solvent consisting essentially of pentanol having from about 10% to about 40% by volume of water dissolved therein, reacting the sulfur and hydrogen sulfide in contact with said solvent, thereby forming sulfur in a readily recoverable crystalline state and separating the sulfur from said solvent.

6. A process for the production of sulfur in a readily recoverable crystalline state which comprises absorbing sulfur dioxide and hydrogen sulfide in a solvent consisting essentially of a monohydric alcohol of from 1 to 5 carbon atoms per molecule having from about 10% to about 40% by volume of water dissolved therein, reacting the sulfur dioxide and hydrogen sulfide in contact with said solvent, thereby forming sulfur in a readily recoverable crystalline state, and separating the sulfur from said solvent.

References Cited in the file of this patent

UNITED STATES PATENTS

| 2,550,446 | Blohm et al. | Apr. 24, 1951 |
| 2,881,047 | Townsend | Apr. 7, 1959 |
| 2,987,379 | Urban | June 6, 1961 |

FOREIGN PATENTS

| 734,577 | Great Britain | Aug. 3, 1955 |

OTHER REFERENCES

J. W. Mellor's book, "A Comprehensive Treatise on Inorganic and Theoretical Chemistry," vol. 10, 1930, pages 91, 96 and 97, Longmans, Green & Co., N.Y.

Comey and Hahn book, "A Dictionary of Chemical Solubilities—Inorganic," 2nd ed., 1921, pages 384 and 906, The Macmillan Co., N.Y.